Inventor
J. F. JAWOROWSKI
By Gustav A. Wolff
Attorney

May 16, 1939.　　　J. F. JAWOROWSKI　　　2,158,327
POWER TRANSMISSION AND SPEED REDUCER
Filed Aug. 28, 1937　　　9 Sheets-Sheet 5

Inventor
J. F. JAWOROWSKI
By Gustav A. Wolff Attorney

May 16, 1939.  J. F. JAWOROWSKI  2,158,327
POWER TRANSMISSION AND SPEED REDUCER
Filed Aug. 28, 1937   9 Sheets-Sheet 6

Inventor
J. F. JAWOROWSKI
By Gustav A. Wolff
Attorney

Patented May 16, 1939

2,158,327

UNITED STATES PATENT OFFICE 2,158,327

POWER TRANSMISSION AND SPEED REDUCER

Joseph F. Jaworowski, Cleveland, Ohio

Application August 28, 1937, Serial No. 161,462

7 Claims. (Cl. 74—294)

This invention relates to power transmissions adapted to couple rotary shafts with each other and control their relative speeds or direction of movement with respect to each other.

The invention has for its general object the provision of a semi-hydraulic power transmission for coupling rotary shafts with each other, which transmission permits of infinite variation of speed in forward or reverse rotation between said shafts.

Further objects of the invention are to provide in a manner as hereinafter set forth, a semi-hydraulic power transmission of the class referred to, which is comparatively simple in its construction and arrangement, strong, durable, compact, and highly efficient in its use, which transmission embodies a simple and positive control, is readily assembled and installed with respect to a driving member and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to, which fall within the scope of the claims hereinto appended.

In the drawings wherein like reference characters denote corresponding parts throughout the several views:

Figs. 13–25 are side views partly in section of the disassembled semi-hydraulic transmission. Thus:

Fig. 19 through 24 are sectional views through the coupling member which shiftably connects the collar with the rotatable operating cam lever of the device, thus:

The semi-hydraulic power transmission in accordance with the invention, comprises a driven section which is always connected to the driven shaft, a driving section which is coupled with a motor, steam turbine, or other prime mover, and an intermediate or controller section. However, as the three above named sections partly encroach each other, no effort has been made to individually describe each of the sections.

Referring to the drawings in detail, the reference character 2 indicates a housing which forms a chamber 3. One end of this housing is closed by a cover plate 4 and its other end by a cover plate 5. The plates 4 and 5 are screwed to the opposite ends of the housing 2 in any suitable manner, as by bolts 6, which pass through bosses 7 provided for this purpose in the plates 4 and 5, and each include, centrally thereof, laterally extending sleeves or hub portions 8 and 9 respectively, which portions form bearing supports for the bearings of a driven shaft 14 and a drive shaft 15. The shafts 14 and 15 extend through the hub portions 8 and 9 respectively and are provided with key ways 14', 15' to permit of the shafts being coupled with the device to be driven (not shown) and a prime mover (also not shown).

Housing 2 at its top is bulged outwardly to form a longitudinal recess or channel 10, which channel is in open communication with the chamber 3. The wall of the channel 10 is preferably provided with a threaded passage or opening 11 to permit of oil or operating liquid being fed into the chamber 3, and this passage is closed by a removable, threaded taper plug 12.

To promote proper support of the driven shaft 14 in cover plate 4, the cylindrical inner wall of the extension or hub portion 8 seats the outer rings 18 of a pair of spaced ball bearings 19, 19', the inner rings 20 of which are pressed upon the driven shaft 14. These ball bearings are spaced from each other by means of two telescoped sleeve members 21, 22, the inner member 21 of which spaces the inner rings 20 and the outer member 22 of which spaces the outer rings 18. Preferably, as shown, member 22 is held in proper working position by means of a set screw 23, which screw engages a circumferential slot 23' in the outer wall of the sleeve member 22. A nut 24, secured to the threaded portion 25 of the driven shaft 14 and held against rotation by means of a lock washer 26, prevents lateral movement of the ball bearings, the bearing 19' of which rests and seats against a circumferential shoulder 27 on shaft 14. Hub portion 8 is provided with a centrally perforated end wall 8', the opening 28 of which permits shaft 14 to be extended outwardly, and the circumferential inner edge of said end wall is recessed as at 30 and seats a packing 29 within the recess to fluid tightly seal the shaft to the hub portion and prevent escape of operating liquid.

The hub portion 9 on cover plate 5 mounts a sleeve bearing 31 for drive shaft 15. This bearing is pressed into a longitudinal bore 32 of said hub portion, which bore is axially aligned with respect to shaft 14. The shaft 15, which extends through cover plate 5 into chamber 3, supports at its inner portion a controlling unit or member C which is coupled with and rotatably mounted upon said shaft and has its inner end rotatably supported upon the inwardly extended reduced end 33 of the driven shaft 14, a roller bearing 34, engaging shaft 14 and the axially bored end 44 of the controlling member C being used for this purpose. The member C embodies a gear pump unit D with diametrically arranged pumping sections E and F, which sections are symmetrically arranged with respect to drive shaft 15 and directly coupled with said shaft for simultaneous operation. The gear pump unit D embodies a disk-shaped body 35 with flat end faces 36, 36' having secured thereto covers or closure plates 37, 38 respectively, which plates are removably secured to body 35 by means of bolts 39. Closure plates 37, 38 are provided with hubs 40, 41 respectively which carry sleeve bearings 42, 43, sleeved upon the drive shaft 15 to rotatably support unit D on said shaft, and shaft 15 extends through closure plate 38, body 35 and with its bored end 44 into sleeve bearing 42 of hub portion 40. However, it should be noted that shaft 15 is not fully extended through hub portion 40 to permit of communication of the bored end 44 of said shaft with chamber 3 through a plurality of radial bores 45 in the bored central extension 46 of the hub 40, and therewith idle rotation of the gear pump unit D, as will be later described.

The body 35 of the pump unit D is formed with an irregularly shaped opening 47, extending therethrough, which opening includes two diametrically opposed, substantially circular portions 48 and 49, and a centrally arranged, substantially circular portion 50, which latter portion intersects with the portions 48 and 49. The drive shaft 15 extends centrally through the portion 50 and separates the portions 48 and 49 from each other, which portions form individual working chambers for the pumping sections E and F of the pump unit D. The part of the drive shaft 15 which extends through the circular portion 50 of the opening 47 is enlarged in cross section and, at its periphery, provided with gear teeth 51 adapted to mesh and engage with the teeth 52 of two gear wheels 53, 54, mounted for rotation in the respective circular portions or working chambers 48, 49 of the opening 47. Gear wheels 53 and 54 include integral shafts 55, 56 respectively, which shafts are mounted in the closure plates 37, 38 and the hub portions 40, 41 of these plates, split bearings 57 and sleeve bearings 58 being used for this purpose.

Figure 5:
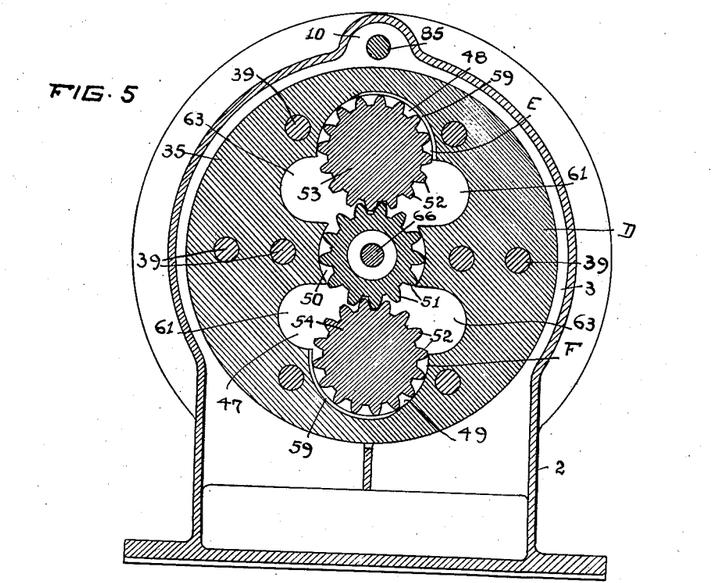
Fig. 5 is a cross sectional view taken on line 5—5 of Fig. 1.
Figure 6:
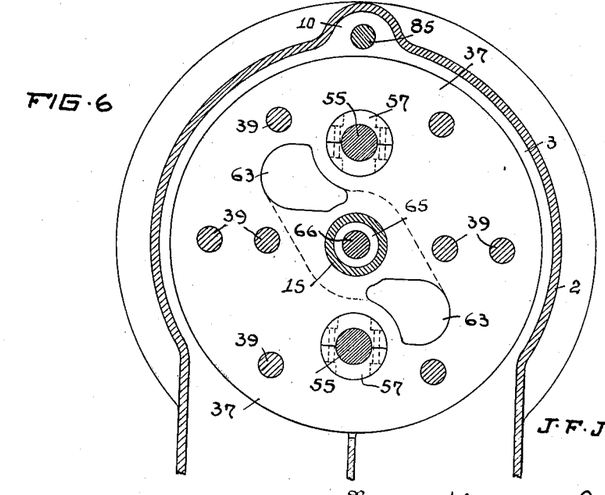
Fig. 6 is a cross sectional view taken on line 6—6 of Fig. 1.
Figure 7:
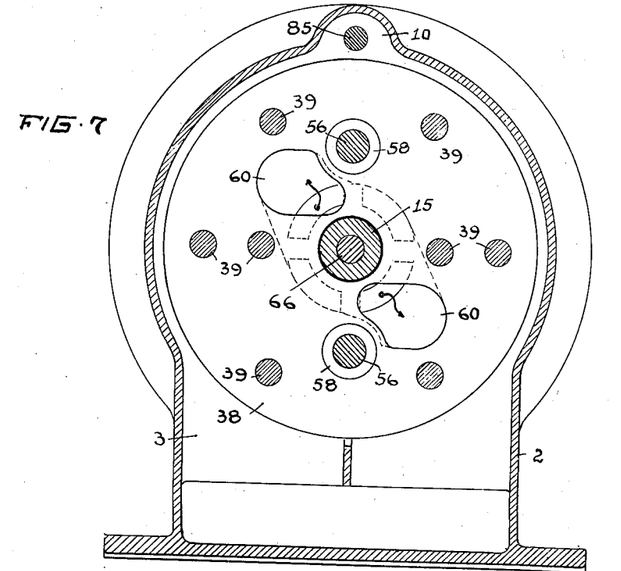
Fig. 7 is a cross sectional view taken on line 7—7 of Fig. 1.
Figure 8:
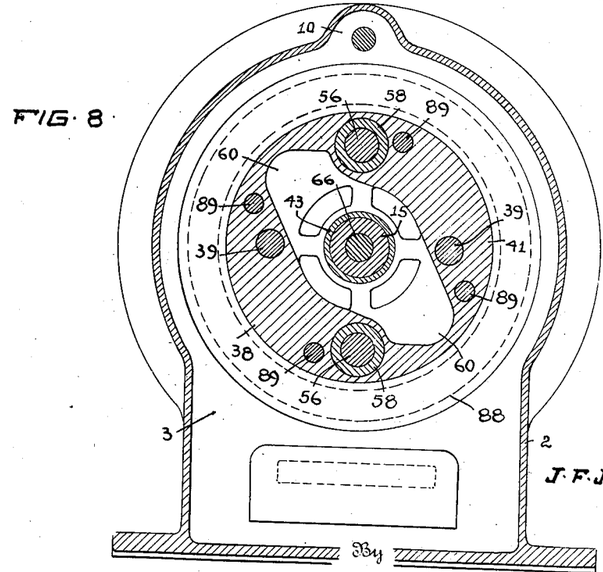
Fig. 8 is a cross sectional view taken on line 8—8 of Fig. 1.
Figure 9:
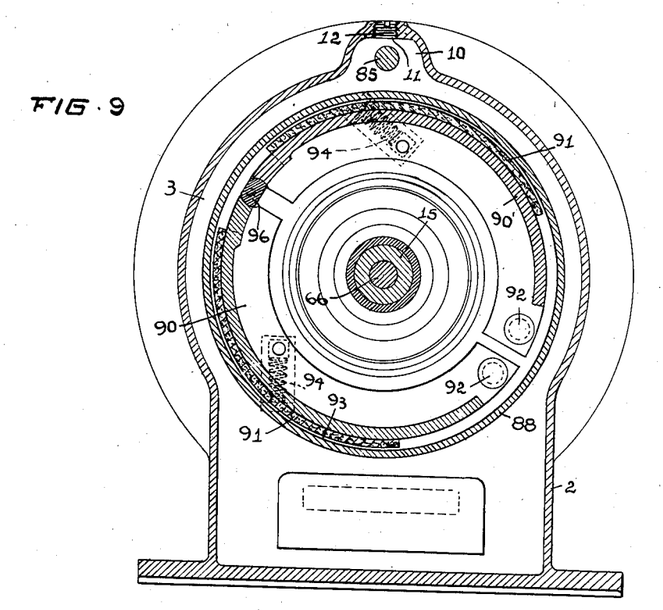
Fig. 9 is a cross sectional view taken on line 9—9 of Fig. 1.

The cross sections of the circular portions 48, 49 of opening 47 correspond to the diameters of the gear wheels 53, 54, so that their gear teeth 52 engage with the inner wall of the working chambers 48, 49. Preferably, as shown in Fig. 5, the walls of the working chambers are partly undercut as at 59 to reduce pressure on gear wheels 53, 54 and shafts 55, 56.

In operation, liquid is drawn by suction of the pumping sections E and F from chamber 3 into working chambers 48, 49 through intake passages 60, which passages communicate with intakes 61 of the working chambers 48, 49 and with the lower portion of chamber 3. A single passage 62 in the head plate 5 and housing 2 terminating slightly above the bottom wall of the chamber 3 feeds the liquid to both intake passages 60. This liquid is carried by the teeth of the gear wheels 53, 54 from the intakes 61 to the outlets 63 of the working chambers, thereafter discharged into and through a valve controlled passage 64 and passages 64' and finally fed back into the chamber 3 through the radial bores 45 in the bored central extension 46 of the hub portion 40.

A piston like valve member 65 which is slidably arranged in the bored end of drive shaft 15 permits of the slots 64' in shaft 15 being controlled and thus effects complete control of the liquid circulated through pump sections E and F. Valve member 65 is connected to and carried by a rod 66, slidably arranged in a reduced central bore 67 in shaft 15, which bore is intersected by an elongated opening or slot 68 in shaft 15. The slot 68 carries and guides a cross pin 69, coupled with the end of the rod 66 and with a grooved collar 70, which collar is slidably mounted on shaft 15, and, when shifted, as hereinafter described, effects shifting of rod 66 and valve member 65, so as to permit of proper control and setting of the valve to any desired position.

Shafts 55 on gear wheels 53, 54 which, as previously described, extend through closure plate 37, have their outer ends 71 formed with teeth 72, meshing the teeth 73 of a flanged internal gear 74, the flange 75 of which is rigidly secured to the enlarged portion 76 of the driven shaft 14 by means of rivets 76'. The peripheral outer face 77 of internal gear 74 serves as a brake drum for an external brake, having brake shoes 78, 78' pivotally supported on pins 79, 79' and yieldingly held out of contact with the face 77 of gear 74 by means of springs 80, 80'. These brake shoes are provided with lever arms 83 connected by means of a link 82 to a lever 81, which lever is sleeved upon a short shaft 84, in turn pivotally extended through said head plate. A pin 81' secures lever 81 to shaft 84. The operation of lever 81 and therewith the operation of the brake is effected by a rod 85, longitudinally arranged within longitudinal recess or channel 10 and pivotally mounted in cover plate 5. The rod 85 extends with its squared end 86 into the square opening 87 in lever 81 and is thus coupled with said lever, however, any other suitable coupling may be used if so desired.

When shaft 15 is rotated in a clockwise direction and valved passage 64 is in fully opened position, then pump sections E and F are not under load, and consequently the toothed portions 71 of shafts 55, engaging internal gear 74, rotate unit C in a clockwise rotation. Under these conditions shaft 14 is stationary because liquid or oil circulating through pump sections E and F flows therethrough and is freely discharged from these sections.

When shaft 15 is rotated in a clockwise direction and valved passage 64 is fully closed by valve member 65, then the gear wheels 53, 54 cannot rotate as the outlet openings of the pump sections are closed. Consequently the shaft 14 rotates in a clockwise direction with the speed of the driving shaft 15.

When shaft 15 is rotated in a clockwise direction and valved passage 64 is partly closed by the valve member 65, then unit C rotates in clockwise rotation at a differential speed with respect to the drive shaft 15 and driven shaft 14 rotates in clockwise rotation with a speed proportionate to the difference in the speeds of drive shaft 15 and unit C.

It will now be seen that the rotary movement of the driven shaft may be varied over substantial ranges by manual or automatic control of the valve member 65.

A reverse rotary movement of the driven shaft can be effected by arresting rotation of unit C. This is effected by means of an internal brake, embodying a brake drum 88, rigidly secured to the closure plate 38 by means of bolts 89, and brake shoes 90, 90' covered with a brake lining 91. The brake shoes 90, 90' are pivotally secured to the cover plate 5 by headed bolts 92 and yieldingly held out of contact with the braking face 93 of brake drum 88 by means of springs 94. The opposed free ends of brake shoes 90, 90' are cut on converging lines 95 for co-operation with a wedge-shaped member 96, which member forms the front portion of a shiftable plunger 97, longitudinally shiftably mounted in a chambered bracket member 98, in turn secured to a raised chambered portion 100 on cover plate 5 by means of bolts 99. Portion 100 on cover plate 5 is chambered to permit of said plunger being extended into chamber 3, so as to actuate the internal brake, as will be presently described. Thus, chambered bracket member 98 pivotally mounts in its chamber 101 a double lever 102, pivotally supported upon a pivot pin 103. This lever 102 has oppositely extended arms 104, 105, provided with rounded end portions. The lever arm 104 extends through a slot 106 in plunger 97 and slidably engages the end 107 of a hardened pin 108, threadedly extended through a threaded bore 109 in the outer end of plunger 97 and held in adjusted position by a lock nut 110; and the lever arm 105 extends into a slot 111 of a bifurcated secondary plunger 112, which latter is axially shiftably mounted in a bore 113 of bracket member 98. An enlarged head portion 114 on the slotted inner end of plunger 112 limits its outer movement and a roller 115, pivotally secured by means of a pin 116' between bifurcations 116 of said plunger, permits of rolling engagement of plunger 112 with an operating mechanism, hereinafter to be described, for axially shifting plunger 97 so as to actuate the internal brake. A spring 117, seated against a shoulder 118 of plunger 97 and the inner wall 119 of bracket member 98, shifts plunger 97 inwardly when plunger 112 is released from rolling contact with the operating mechanism referred to above. This operating mechanism embodies a cylindrically shaped cam member 120, rotatably secured to cover plate 5 by means of a substantially cylindrically shaped, flanged cover member 121, which cover member is connected to said cover plate 5 by means of bolts 122, extended through openings 123 in the flange 124 of said cover member, and which member has its outer end closed by apertured plate 125, secured to said member by bolts 126. The cylindrical sidewall 127 of member 121 is cut away at 128 to permit of a lever 129 being extended therethrough and shifted through an arc of approximately 90°. Cam member 120 supports lever 129 and is coupled with the collar 70 on the drive shaft 15 by means of a ring member 130 provided with diametrically opposed short studs 131. These studs extend through inclined slots 132 in cam member 120 and are guided in straight recesses 133 in cover member 121 to prevent rotation of ring member 130, when shaft 15 and collar 70 are jointly rotated. A pair of thrust washers 134, 134', engaging the opposite sides of the ring member 130 take up lateral stresses during shifting operations, which washers seat against a flange 135 on collar 70 and are held in proper position by nuts 136, 137 and a lock washer 138, engaged with the threaded and keyed end 139 of collar 70.

Figure 10:
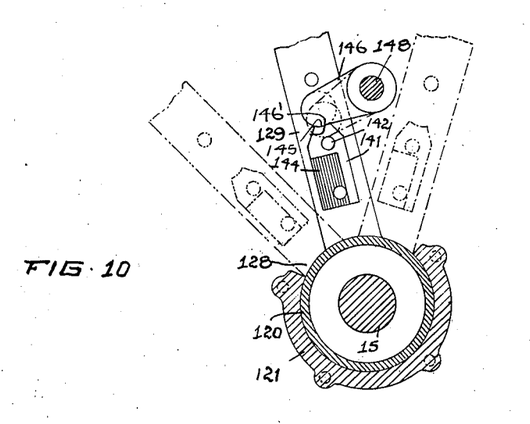
Fig. 10 is a cross sectional view taken on line 10—10 of Fig. 1.

Lever 129 carries and actuates the outer and inner brake members by means of a cam member 141, adjustably connected to lever 129 by bolts 142. These bolts are extended through a slot 143 in lever 129 and threadedly engage with cam member 141. The cam member 141 embodies a beveled face 144 adapted to engage the roller 115 at the end of plunger 112 and effect inward movement of the plunger 97 and therewith operation of the internal brake, and the upper end of cam member 141 is reduced in width and the edge formed with a circular recess 145 to permit of a lever 146, coupled with rod 85, being lifted thereby and held when a roller 147 at the end of lever 146 is riding upwardly on the inclined edges 146'' of the cam 141, when member 120 and operating lever 129 are shifted from the dash double dotted line position of Fig. 10 to the full line position of this figure. It will now be seen that lever 146, which lever is coupled with the outer end 148 of the rod 85, effects actuation of the valve member 64, the outer brake member and the inner brake member.

In operation of the power transmission, drive shaft 15, which is driven by a prime mover, effects circulation of a body of liquid, which liquid is stored in chamber 3 and preferably of high conductivity, high boiling point, good lubricating qualities and high viscosity. When the operating lever is in neutral position cam member 141 and the operating lever 129 are in the full line position of Fig. 10. In this position the gear pump unit draws liquid from chamber 3 through passages 62 and 60 into the intakes 61 of the two working chambers 48, 49, feeds such liquid through the pump sections and their outlets 63 into and through the fully opened valved passage 64 and finally discharges the liquid into and through the bored end of the unit C through radial outlet bores 45 back into the chamber 3.

In such neutral position of the transmission operating cam member 120 has shifted ring member 130 and valve member 65 toward the right, and consequently the valved passage 64 is unobstructed and permits of the liquid being freely discharged from pump sections D and E back into chamber 3. The circular notch 145 at the top of the cam member 141 holds lever 146 in raised position and therewith rod 85, so that link 82 draws brake shoes 78, 78' against the brake surface 77 of the ring gear 74, thus insuring arrest of ring gear 74 and driven shaft 14 coupled therewith.

Figure 1:
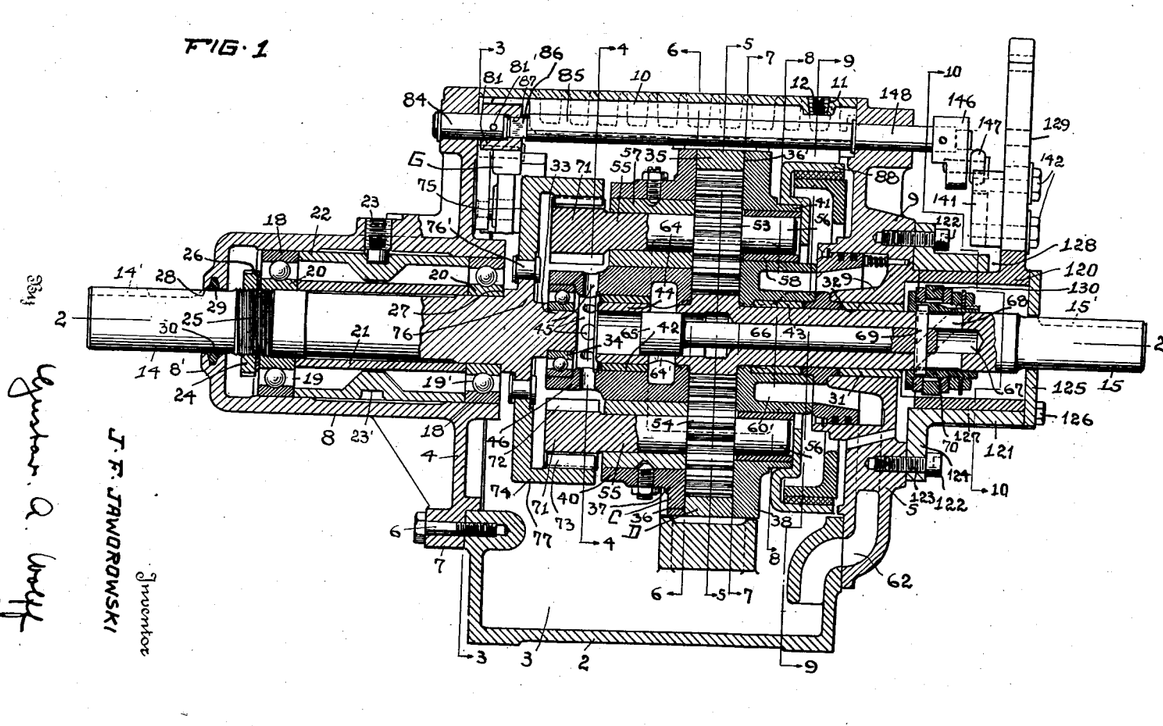
Fig. 1 illustrates a longitudinal sectional view of the semi-hydraulic power transmission in accordance with the invention.
Figure 2:
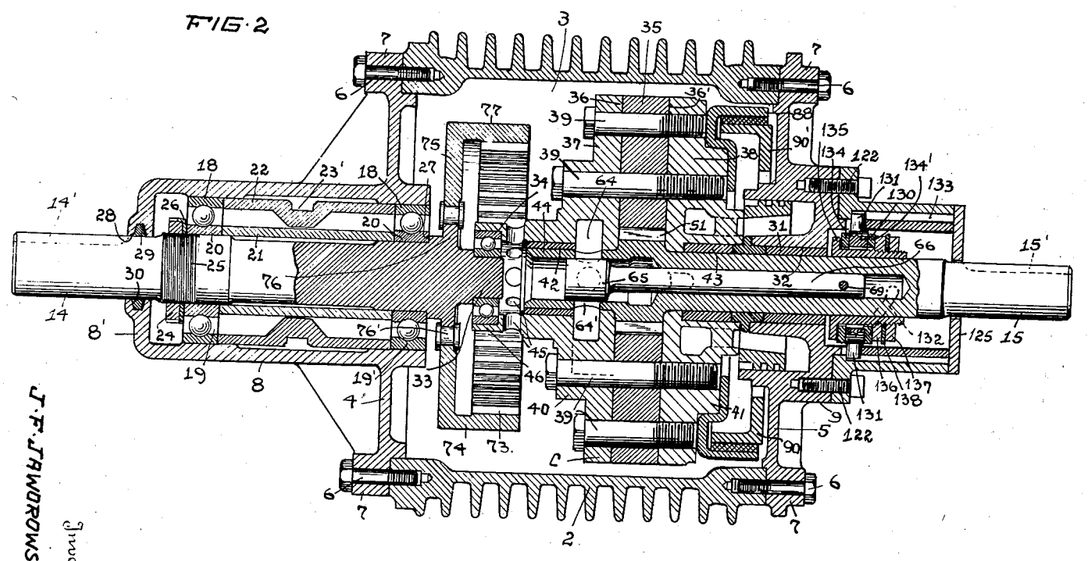
Fig. 2 is a longitudinal sectional view through the power transmission shown in Fig. 1, the section being taken on line 2—2 of Fig. 1.
Figure 3:
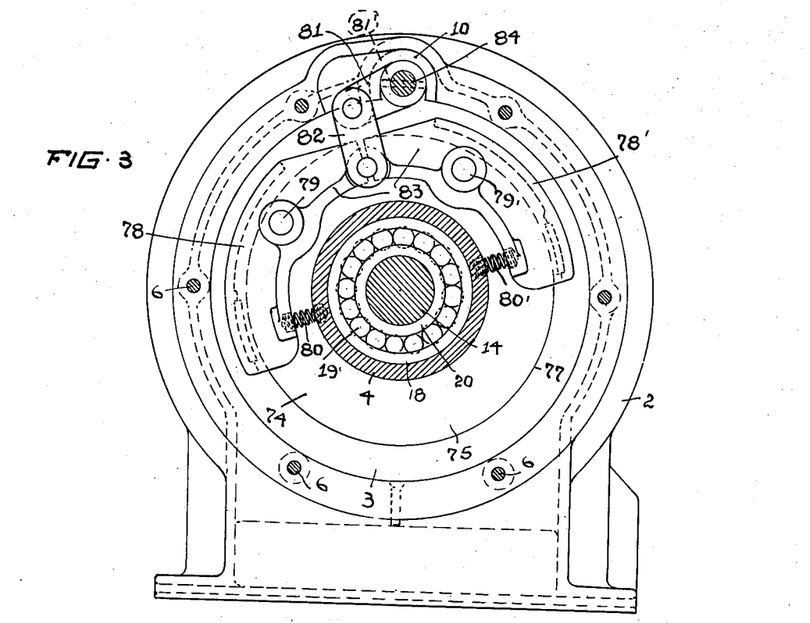
Fig. 3 is a cross sectional view through the power transmission, the section being taken on line 3—3 of Fig. 1.
Figure 4:
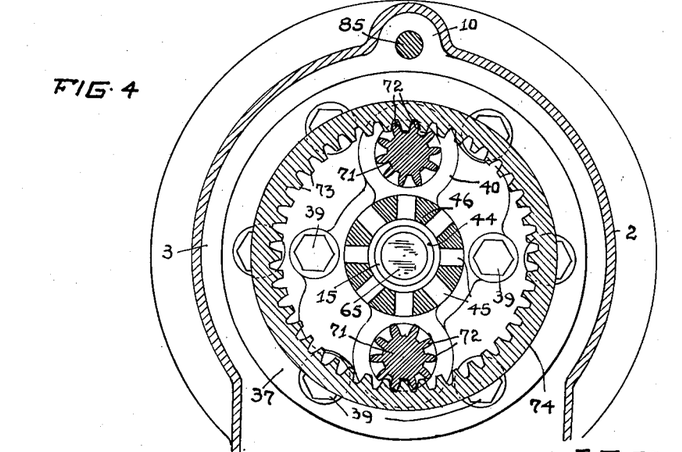
Fig. 4 is a cross sectional view taken on line 4—4 of Fig. 1.
Figure 11:
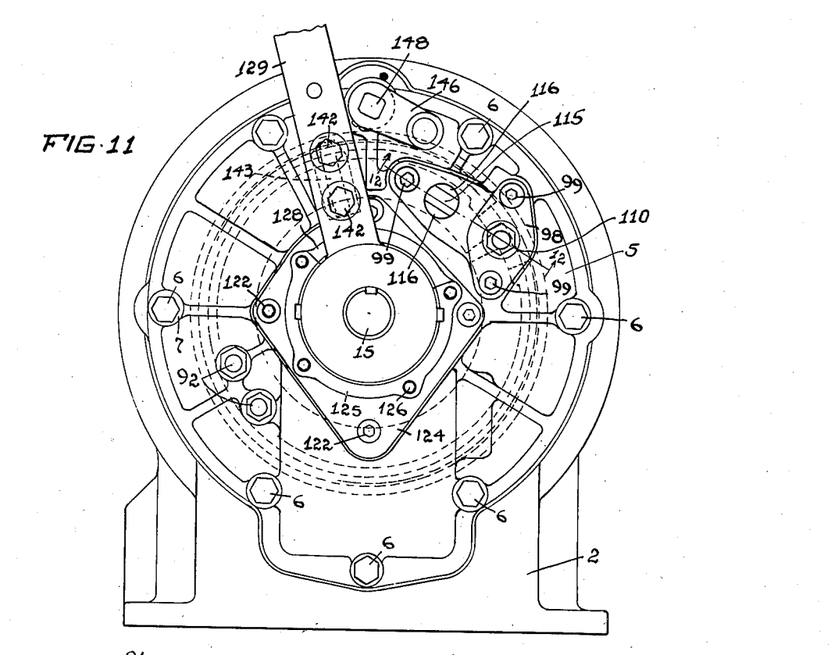
Fig. 11 is an end view of the semi-hydraulic power transmission showing the operating lever arrangement.
Figure 12:
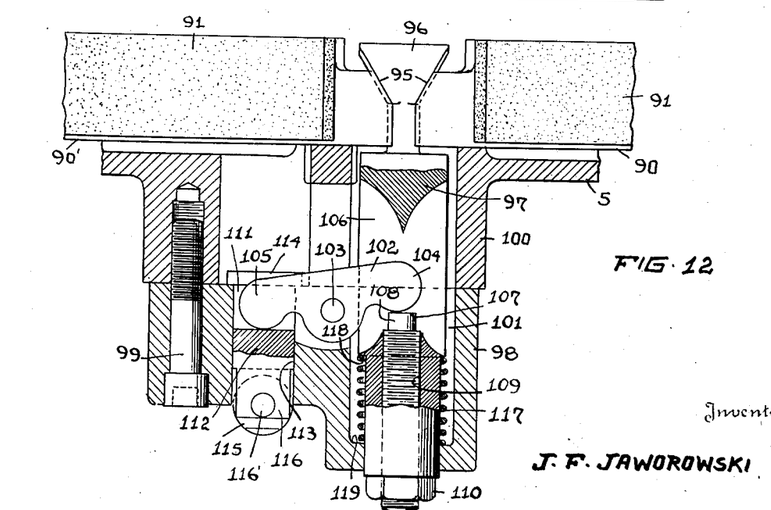
Fig. 12 is an enlarged sectional view on line 12—12 of Fig. 11.
Figure 13:
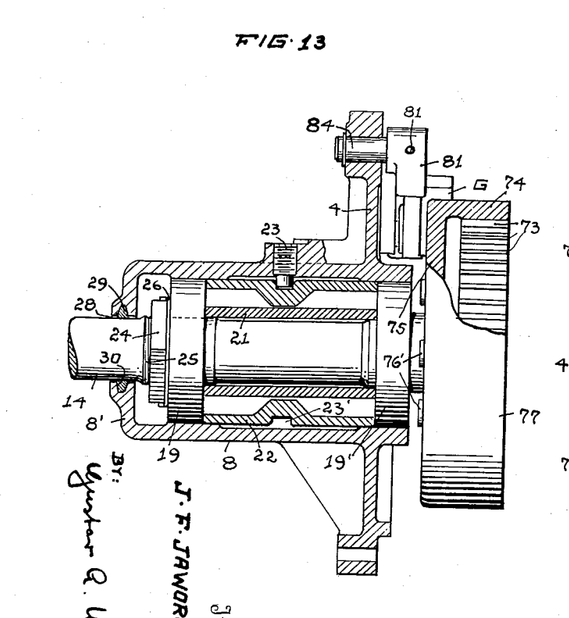
Fig. 13 is a sectional view through the cover member carrying and supporting the driven shaft with the ring gear and the outside brake therefor, the shaft and its bearings being shown in side elevation.
Figure 14:
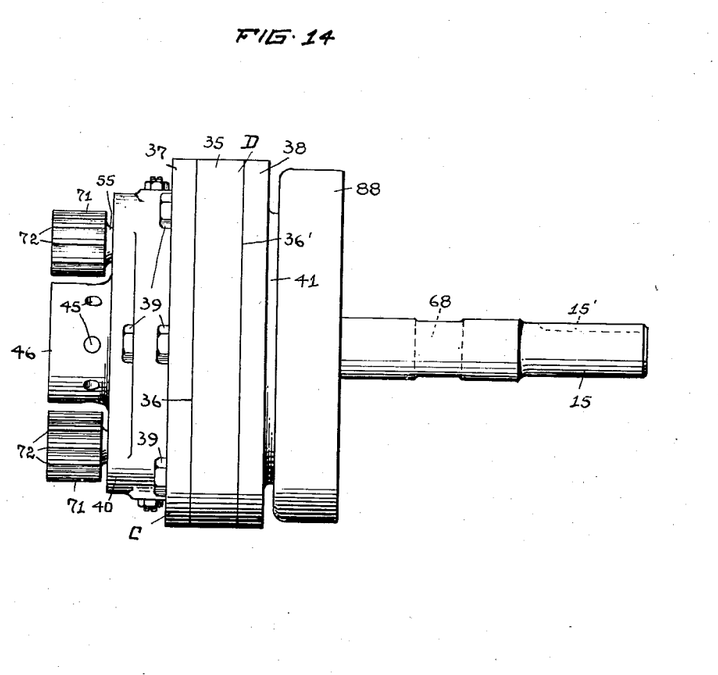
Fig. 14 is a side elevation of the assembled driving section and controller section of the power transmission.
Figure 15:
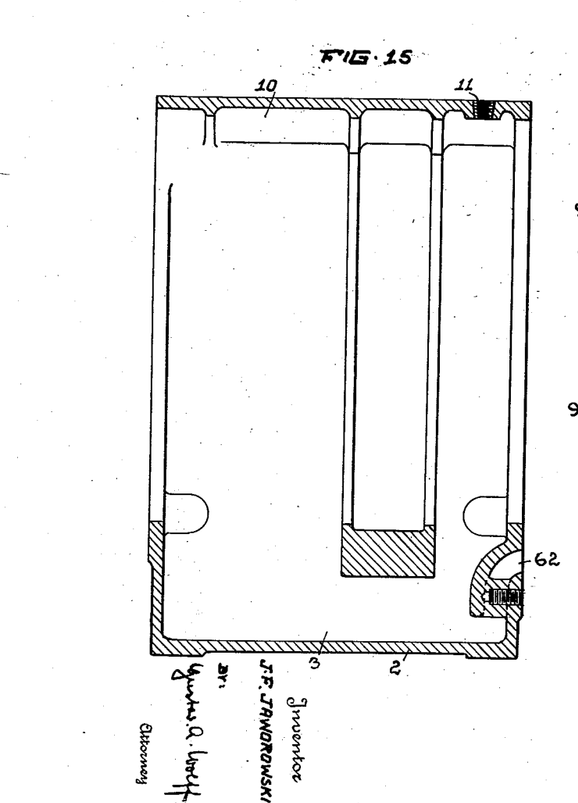
Fig. 15 is a sectional view through the housing.
Figures 16, 17, 18, 19, 20, 21, 22, 23, 24, 25:
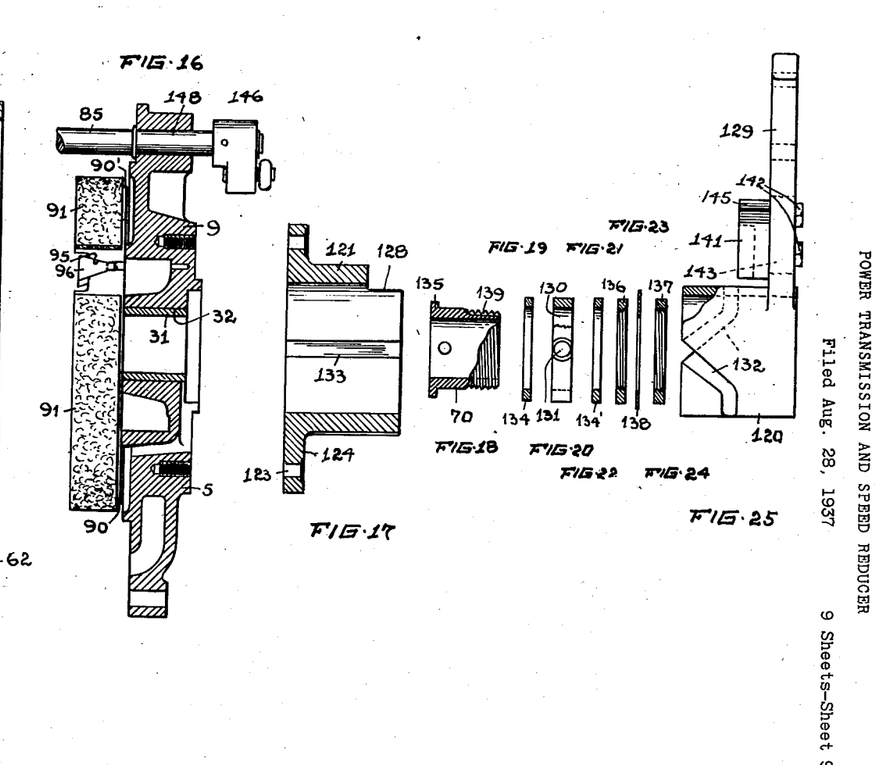
Fig. 16 is a sectional view through the cover member, which member carries and supports the drive shaft of the driving section and the controller section. In this view the inner brake shoes which are attached to the cover and the brake operating rod are shown in elevation.
Fig. 17 is a sectional view through the guide and supporting member for the operating lever of the device.
Fig. 18 is a sectional view through the valve operating collar.
Fig. 19 is a sectional view through a washer.
Fig. 20 is a sectional view, partly in elevation, through the studded ring coupling the collar with the guide and supporting member and with the rotatable operating cam lever.
Fig. 21 is a sectional view through a second washer.
Figs. 22 and 24 are sectional views of the nuts securing the studded ring coupling to the collar.
Fig. 23 is a sectional view through the lockwasher interlocking the nuts shown in Figs. 22 and 24.
Fig. 25 is a side view partly broken away of the operating cam lever for the power transmission.

To effect rotation of the driven shaft in the direction of rotation of the drive shaft, operating lever 129 is shifted toward the left to dash double dotted position (Fig. 11). In this case lever 129 and valve member 65 are in Fig. 1 position, in which outlet passage 64 for pump unit D is fully closed and gear wheels 53, 54 are prevented from rotation, so that unit C directly couples the drive shaft and the driven shaft with each other. When operating lever 129 is located between the neutral and the last described position, then valved passage 64 is partly restricted, therefore the gear wheels 53 and 54 rotate with a speed lower than their rotary movement in the neutral position of lever 129.

Should it be desired to rotate the driven shaft in a direction opposite to the rotation of the drive shaft, then operating lever 129 is shifted toward the right to effect engagement of the beveled face 144 of the cam member 141 with the roller 115 and therewith shifting of plunger 112 inwardly for actuation of the internal brake, so as to stop rotation of unit C, which of course effects a reversed rotation of the driven shaft 14 by the drive shaft 15.

The internal brake of the mechanism described effects coupling of the controller section with the driven and drive shaft or with the housing, and also permits of a free rotary action of the mechanism.

The described power transmission according to the invention permits of infinite variations of the speed of the driven shaft in opposite directions with a driving shaft rotating at constant speed in one direction. Unit C, when rotating at high speed acts as a fly wheel and thus effects uniform and steady run of the prime mover coupled with the drive shaft.

Although I have illustrated and described a preferred embodiment of my invention, yet it is to be understood, that changes in the details of construction can be had which will fall within the scope of the invention as claimed.

Having thus described my invention, what I claim is:

1. A power transmitting and speed reducing unit comprising a casing, a drive shaft and a driven shaft, said shafts extending from opposite sides into said casing, a member for coupling said shafts rotatably mounted within said casing upon said shafts, valve controlled pumping means within said coupling member embodying rotors directly coupled with said drive shaft, and pinions at the ends of said rotors, a ring gear connected to the driven shaft in driving connection with said pinions, valve means controlling the rotors of said pumping means, a brake for said ring gear, a brake for said coupling member, and means including a single operating lever for jointly actuating said valve means and one and/or the other of said brakes.

2. A power transmitting and speed reducing unit comprising a casing, a drive shaft and a driven shaft, said shafts extending from opposite sides into said casing, a member for coupling said shafts rotatably mounted within said casing upon said shafts, valve controlled pumping means within said coupling member embodying rotors directly coupled with said drive shaft and indirectly coupled with said driven shaft by means of a ring gear and pinions, valve means controlling the rotation of the rotors of said pumping means, braking means for said coupling member, braking means for said driven shaft, and means including a single operating lever for actuating said valve means and said braking means.

3. A power transmitting and speed reducing unit as described in claim 1, wherein said braking means for said driven shaft and said braking means for said coupling member are individually actuated by the lever of said actuating means.

4. A power transmitting and speed reducing unit as described in claim 1, wherein said drive shaft embodies an axial bore, wherein said pumping means include outlet passages terminating in the bore of said drive shaft, wherein said valve means are slidably arranged in the bore of said drive shaft for controlling the open ends of said outlet passages, and wherein said actuating means has its lever coupled with said valve means.

5. A power transmitting and speed reducing unit comprising a casing, an axially bored drive shaft, a driven shaft, said shafts being axially aligned and extending from opposite sides into said casing in spaced relation with respect to each other, a member for coupling said shafts with each other having an axial bore for rotatably mounting said member on said shafts, passage means in said member for open communication of its bore with said casing, said passage means being arranged in alignment with the space between said shafts, valve controlled pumping means within said coupling member embodying rotors directly coupled with the drive shaft and indirectly coupled with the driven shaft by means of a ring gear and pinions, said pumping means including inlet means in communication with said casing and outlet means in communication with the bore of said drive shaft, and shiftable valve means within the bore of said drive shaft for controlling the said outlet means, said shiftable valve means embodying mechanism for actuation of said valve means from the outside of said casing.

6. A power transmitting and speed reducing unit as described in claim 5, embodying a brake for said driven shaft, a brake for said coupling member, and actuating means embodying means coupling said actuating means with said valve means and said brakes for joint actuation of said valve means and said brakes.

7. A power transmitting and speed reducing unit as described in claim 5, embodying an external brake for said driven shaft, an internal brake for said coupling member and a lever for actuating said valve means and said brakes, said lever embodying means for coupling same with said valve means, and cam means for actuating said brakes to effect operation of said valve means and brakes by a rocking movement of said lever.

JOSEPH F. JAWOROWSKI.